(12) United States Patent
Kumar et al.

(10) Patent No.: US 10,514,833 B2
(45) Date of Patent: Dec. 24, 2019

(54) CONTEXTUAL PASTE TARGET PREDICTION

(71) Applicant: Google Inc., Mountain View, CA (US)

(72) Inventors: Aayush Kumar, Zurich (CH); Gokhan Bakir, Zurich (CH)

(73) Assignee: GOOGLE LLC, Mountain View, CA (US)

( * ) Notice: Subject to any disclaimer, the term of this patent is extended or adjusted under 35 U.S.C. 154(b) by 324 days.

(21) Appl. No.: 15/418,168

(22) Filed: Jan. 27, 2017

(65) Prior Publication Data

US 2018/0188924 A1  Jul. 5, 2018

Related U.S. Application Data

(60) Provisional application No. 62/440,835, filed on Dec. 30, 2016.

(51) Int. Cl.
| | |
|---|---|
| G06F 3/0484 | (2013.01) |
| G06F 9/48 | (2006.01) |
| G06F 3/0481 | (2013.01) |
| G06N 5/04 | (2006.01) |
| G06F 3/0482 | (2013.01) |

(52) U.S. Cl.
CPC ........ G06F 3/04842 (2013.01); G06F 3/0481 (2013.01); G06F 9/4843 (2013.01); G06N 5/04 (2013.01); G06F 3/0482 (2013.01)

(58) Field of Classification Search
None
See application file for complete search history.

(56) References Cited

U.S. PATENT DOCUMENTS 9,465,682 B1 *  10/2016  Powell .................... G06F 9/543
9,680,874 B1 *  6/2017   Burnett .................. H04L 63/20
(Continued)

FOREIGN PATENT DOCUMENTS

| JP | 2012133594 A | * | 7/2012 |
| JP | 2012133594 A1 | | 7/2012 |
| WO | WO2013000123 A1 | | 1/2013 |

OTHER PUBLICATIONS

Translation document for JP-2012133594-A.*

(Continued)

*Primary Examiner* — Abdullah Al Kawsar
*Assistant Examiner* — David V Luu
(74) *Attorney, Agent, or Firm* — Middleton Reutlinger (57) ABSTRACT

Contextual paste target prediction is used to predict one or more target applications for a paste action, and do so based upon a context associated with the content that has previously been selected and copied. The results of the prediction may be used to present to a user one or more user controls to enable the user to activate one or more predicted application, and in some instances, additionally configure a state of a predicted application to use the selected and copied content once activated. As such, upon completing a copy action, a user may, in some instances, be provided with an ability to quickly switch to an application into which the user was intending to paste the content. This can provide a simpler user interface in a device such as phones and tablet computers with limited display size and limited input device facilities. It can result in a paste operation into a different application with fewer steps than is possible conventionally.

16 Claims, 6 Drawing Sheets

(56) References Cited

U.S. PATENT DOCUMENTS

| | | | |
|---|---|---|---|
| 2003/0154207 A1* | 8/2003 | Naito | G06Q 10/10 |
| 2008/0127137 A1 | 5/2008 | Becker et al. | |
| 2009/0112597 A1* | 4/2009 | Tarrant | G10L 13/00 |
| | | | 704/260 |
| 2010/0153324 A1* | 6/2010 | Downs | G06F 17/2745 |
| | | | 706/21 |
| 2011/0161880 A1* | 6/2011 | Abbott | G06F 3/04842 |
| | | | 715/823 |
| 2012/0258696 A1* | 10/2012 | Nam | H04W 4/02 |
| | | | 455/414.2 |
| 2012/0303763 A1 | 11/2012 | Duggal | |
| 2013/0339889 A1 | 12/2013 | Bastide et al. | |
| 2015/0032714 A1* | 1/2015 | Simhon | G06F 16/951 |
| | | | 707/706 |
| 2016/0321052 A1 | 11/2016 | Sharifi et al. | |

OTHER PUBLICATIONS

Irish Patent Office; Search Report and Written Opinion issued in Application No. 2017/0202 dated Apr. 10, 2018.

European Patent Office; Written Opinion of the International Preliminary Examining Authority for PCT Application Serial No. PCT/US2017/052597; 13 pages; dated Jun. 6, 2018.

European Patent Office—International Searching Authority; Notification of Transmittal of the International Search Report and the Written Opinion of PCT Serial No. PCT/US2017/052597; dated Nov. 23, 2017.

Joecks, Simon; Clipboard Actions—Google Play; 5 Pages; dated Jul. 24, 2016.

United Kingdom Intellectual Property Office; Combined Search and Examination Report issued in Application No. 1715733.0 dated Mar. 16, 2018.

\* cited by examiner

CONTEXTUAL PASTE TARGET PREDICTION

BACKGROUND

Computing devices have long supported various editing actions such copy, cut and paste. A copy action is generally performed after a user has selected some displayed content, and results in the selected content being copied to a temporary storage commonly referred to as a clipboard. A paste action is generally performed when a user desires to insert previously-copied content elsewhere, and results in the previously-copied content in a clipboard being inserted at a user-specified location. A cut action may be considered to be a sub-type of a copy action, as like a copy action, a cut action causes selected content to be copied to a clipboard. However, with a cut action, the selected content is then deleted from its original location.

Copy, cut and paste actions are commonly used in word processing applications, for example, to manipulate text, images and other types of content in a word processing document. Copy, cut and paste actions, however, are also used for a wide variety of other purposes, including manipulating files in a storage system. Furthermore, since the advent of multitasking and the support of multiple simultaneously-executing applications, copy, cut and paste actions have been used to copy or move content between different applications. For example, if a user finds an interesting item when browsing the web and wishes to share that item with another user via email or text message, the user may need to copy the item in a browser application and paste it into an email or text messaging application. Likewise, if a user encounters a geographical location in a web page or in an email and wishes to view that location on a map, the user may need to copy the item from a browser or email application and paste it into a search box of a map application.

Copying or cutting content such as text from one application and pasting that content into a different application, however, can be laborious in many computing devices, particularly mobile devices such as smartphones and tablets where windowing is not used for applications (i.e., only one application is displayed at a time). On a mobile device, for example, a user wishing to copy text from one application to another application may require the user to first select the text by tapping and/or dragging on a touchscreen display to select the desired text and select a copy user control that performs the copy action. Then, in order to paste that copied text into a different application, the user may be required to press a home button on the computing device, scroll through a list of applications and find the desired application to paste into, and then paste the text into an appropriate user control (e.g., a search box, message box, text box, etc.). In some cases, a user may even have delete some text after pasting (e.g., when pasting into the search box of a map application to properly format the query).

SUMMARY

The present disclosure is generally directed to methods, apparatus, and computer-readable media (transitory and non-transitory) for performing contextual paste target prediction to predict one or more target applications for a paste action, and do so based upon a context associated with the content that has previously been selected and copied. The results of the prediction may be used to present to a user one or more user controls to enable the user to activate one or more predicted application, and in some instances, additionally configure a state of a predicted application to use the selected and copied content once activated. As such, upon completing a copy action, a user may, in some instances, be provided with an ability to quickly switch to an application into which the user was intending to paste the content. This can be particularly useful with mobile devices such as phones and tablet computers where there are limited display size and limited input device facilities. It can result in a paste operation into a different application with fewer steps than is possible conventionally. It can provide a simpler user interface and make the mobile device, with its limited display size and limited input device resources, easier to use.

Therefore, in some implementations, a method may include receiving a control signal initiated in response to a user action to copy selected content on a computing device, using at least one processor, predicting a predicted application into which the selected content is suitable for pasting from among a plurality of applications based upon a context associated with the selected content, and, in response to the control signal, and using at least one processor, causing a user control for the predicted application to be displayed on the computing device, the user control configured to activate the predicted application on the computing device upon user selection.

In some implementations, a method may comprise: responding to a control signal resulting from a user input to copy selected content on a computing device by: selecting, from a plurality of applications, a content paste target application as a predicted application based upon a context associated with the selected content; and causing a user control for the predicted application to be displayed on the computing device, and responding to user selection of the user control by activating the predicted application on the computing device.

In some implementations, the context includes in which application the user action to copy the selected content is performed, and predicting the predicted application includes predicting the predicted application based at least in part on in which application the user action to copy the selected content is performed. Also, in some implementations, the context includes a length of the selected content, and predicting the predicted application includes predicting the predicted application based at least in part on the length of the selected content. Also, in some implementations, the selected content includes text, and predicting the predicted application includes predicting a messaging application from among the plurality of applications as the predicted application if the length of the selected content meets a length criterion, and predicting a search application from among the plurality of applications as the predicted application if the length of the selected content does not meet the length criterion.

Further, in some implementations, the context includes an application history, and predicting the predicted application includes predicting the predicted application based at least in part on the application history. In some implementations, the application history includes a recently-used application, and predicting the predicted application includes predicting the recently-used application as the predicted application based upon the recently-used application being recently used. In some implementations, the application history includes a previously-targeted application previously used as a paste target, and predicting the predicted application includes predicting the previously-targeted application as the predicted application based at least in part upon the previously-targeted application being previously used as a paste target. In addition, in some implementations, predicting the previously-targeted application as the predicted application includes predicting the previously-targeted application as the predicted application based at least in part upon the previously-targeted application being previously used as a paste target for content similar to the selected content. In some implementations, the application history includes a previously-activated application previously activated after a copy action, and predicting the predicted application includes predicting the previously-activated application as the predicted application based at least in part upon the previously-activated application being previously activated after a copy action. Further, in some implementations, the application history includes data indicating that a user previously completed a paste action instead of selecting a user control for a previously-predicted application or indicating further user behavior after activating a previously-predicted application, and predicting the predicted application is based at least in part on the data.

Some implementations may also include analyzing the selected content to identify one or more entities, where the context includes the one or more entities, and predicting the predicted application includes predicting the predicted application based at least in part on one or more entities. In addition, in some implementations, the one or more entities includes an email address, a phone number, a physical address, or a Uniform Resource Locator (URL), and predicting the predicted application includes predicting the predicted application as an email application if the one or more entities includes an email address, predicting the predicted application as a phone application if the one or more entities includes a phone number, predicting the predicted application as a map application if the one or more entities includes a physical address, and predicting the predicted application as a browser application if the one or more entities includes a URL.

Moreover, in some implementations, predicting the predicted application includes determining if multiple entities among the one or more entities are related, if the multiple entities are related, predicting a search application as the predicted application, and if the multiple entities are not related, selecting a highest ranked entity among the multiple entities and predicting the predicted application based at least in part on the highest ranking entity. In some implementations, predicting the predicted application includes ranking multiple applications among the plurality of applications based upon the context and selecting the predicted application as a highest ranking application among the multiple applications.

In some implementations, the user control is displayed along an edge of a display screen of the computing device, the user control configured to activate the predicted application on the computing device in response to a first user input type, and the user control is configured to cause a plurality of secondary user controls to be displayed adjacent to the user control in response to a second user input type, with each of the secondary user controls configured to activate an associated application among the multiple applications upon user selection.

Moreover, in some implementations, the user control is further configured to control the predicted application to configure the application into a predetermined state and perform a paste action using the selected content. In some implementations, the user control includes a deep link targeting the predicted application, and in some implementations, the at least one processor is resident in the computing device, and receiving the control signal includes detecting a copy event on the computing device. In addition, in some implementations, the at least one processor is resident in an online service in communication with the computing device over a network, and receiving the control signal includes receiving a message from the computing device.

Some implementations may also include, in the computing device, detecting a copy event, determining connectivity between the computing device and the online service, in response to determining connectivity between the computing device and the online service, communicating the message to the online service, and in response to determining a lack of connectivity between the computing device and the online service predicting a locally-predicted application from among the plurality of applications based upon the selected content or causing a default user control to be displayed on the computing device.

Some implementations also include a system including one or more processors and memory operably coupled with the one or more processors, where the memory stores instructions that, in response to execution of the instructions by the one or more processors, cause the one or more processors to perform any of the above methods. Some implementations may also include at least one non-transitory computer-readable medium including instructions that, in response to execution of the instructions by one or more processors, cause the one or more processors to perform any of the above methods.

An aspect of this specification provides computing apparatus, optionally a mobile computing device, configured to perform any of the methods recited above.

Another aspect of this specification provides a computer program comprising machine readable instructions that when executed by computing apparatus, optionally a mobile computing device, causes it to perform any of the methods recited above.

It should be appreciated that all combinations of the foregoing concepts and additional concepts described in greater detail herein are contemplated as being part of the subject matter disclosed herein. For example, all combinations of claimed subject matter appearing at the end of this disclosure are contemplated as being part of the subject matter disclosed herein.

DETAILED DESCRIPTION

Currently, copying content such as text in one application and pasting that content into a different application can be tedious in many computing devices, particularly mobile devices such as smartphones and tablets where windowing is not used for applications. It has been found that on average, it takes a user on average roughly 17 seconds to paste text into a different application on a mobile device once text in one application has been selected and copied. A user is generally required to press a home button, scroll through and find the desired application to paste into, and then paste the text into an appropriate user control (e.g., a search box, message box, etc.). In some cases, a user may even have delete some text after pasting (e.g., when pasting into the search box of a map application).

To address these and other issues, implementations of this specification may perform contextual paste target prediction in an attempt to predict one or more target applications for a paste action, and do so based upon a context associated with the content (e.g., text, images, and any other data or entities capable of being copied and pasted in a computing environment) that has previously been selected and copied to a temporary buffer such as a clipboard. A user control may then be presented to enable the user to activate the predicted application, and in some instances, additionally configure a state of the predicted application to use the selected and copied content once activated. As such, upon completing a copy action, a user may, in some instances, be provided with an ability to quickly switch to an application into which the user was intending to paste the content.

As will become more apparent below, the presentation of the user control is generally performed in response to a control signal generated in connection with a user action to copy selected content on a computing device. Thus, the user is generally presented with the option to activate a predicted application upon copying the content, e.g., by selecting a "copy" user control, typing a keyboard shortcut, etc., and after content has already been selected. Put another way, in some implementations the presentation of the user control is not initiated directly in response to selection of content, nor is the presentation of the user control initiated directly in response to activation of an application, but is instead initiated in response to a user action that copies selected content. In addition, the term "selected content" is used herein to refer to content such as text, images, and other selectable content that has been selected by a user and thereafter copied as a result of a copy action. It will be appreciated, however, that the selected content is only selected from the perspective of the copy action, and no implication is made that the content necessarily remains selected after a copy or paste action or at any point in connection with contextual paste target prediction.

Figure 1:
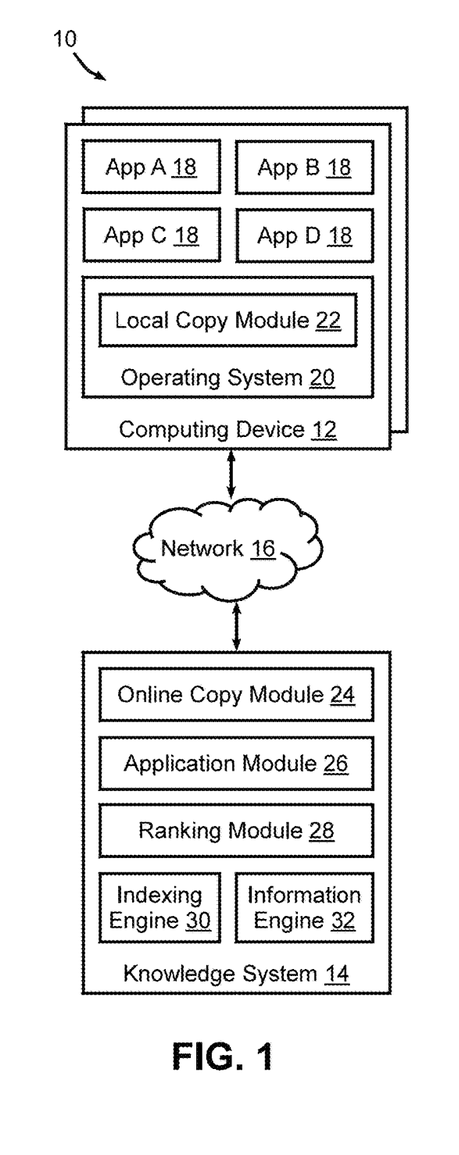
FIG. 1 illustrates an example environment in which disclosed techniques may be practiced, in accordance with various implementations.

Now turning to the drawings, wherein like numbers denote like parts throughout the several views, FIG. 1 illustrates an example computing environment 10 capable of implementing contextual paste target prediction in some implementations. Environment 10 in particular interfaces a plurality of computing devices 12 with a knowledge system 14 over a network 16. Knowledge system 14 may be implemented in one or more computers that communicate, for example, through a network. Knowledge system 14 is an example of an information retrieval system in which the systems, components, and techniques described herein may be implemented and/or with which systems, components, and techniques described herein may interface.

A user may interact with knowledge system 14 via one or more computing devices 12, each of may be a computer coupled to the knowledge system 14 through one or more networks 16 such as a local area network (LAN) or wide area network (WAN) such as the Internet. Each computing device 12 may be, for example, a desktop computing device, a laptop computing device, a tablet computing device, a mobile phone computing device, a computing device of a vehicle of the user (e.g., an in-vehicle communications system, an in-vehicle entertainment system, an in-vehicle navigation system), or a wearable apparatus of the user that includes a computing device (e.g., a watch of the user having a computing device, glasses of the user having a computing device). Additional and/or alternative computing devices may be provided.

Each computing device 12 may operate a variety of different applications 18 (also referred to herein as "apps"), such as applications A, B, C and D. Applications A-D are intended to generically refer to any application that can have an interface exposed to a user of the computing device 12 in response to various events. An application interface may be "exposed" to a user (i.e. allow the user to interact with it) by loading/opening/launching the application (e.g., from non-volatile memory), or, if the application is already initiated/opened/launched in the background, bringing the application to the foreground (e.g., making the application window the active window). Collectively, all of these manners of loading and/or bringing an application into the foreground will be referred to hereinafter as "activating" an application. These apps (and any "predicted application" mentioned herein) can include but are not limited to applications for making reservations or obtaining tickets (e.g., restaurant reservations, hotel reservations, airline reservations, train reservations, event reservations, etc.), map applications, calendar applications, reminder applications, translation applications, media consumption applications (e.g., music or video players), games, messaging apps, email apps, text messaging apps, weather apps, real estate apps, health tracking apps, shopping apps, news apps, ride sharing apps, productivity applications such as word processors or spreadsheet applications, phone applications, browser applications, search applications, and so forth.

Each computing device 12 and knowledge system 14 may include one or more memories for storage of data and software applications, one or more processors for accessing data and executing applications, and other components that facilitate communication over a network. The operations performed by one or more computing devices 12 and/or knowledge system 14 may be distributed across multiple computer systems. Knowledge system 14 may be implemented as, for example, computer programs running on one or more computers in one or more locations that are coupled to each other through a network.

Each computing device 12 additionally includes an operating system 20, and for the purposes of performing contextual paste target prediction, a local copy module 22 implemented therein. Likewise, knowledge system 14 may include an online copy module 24 that is in communication with local copy module 22. In some implementations, contextual paste target prediction may be performed collectively by local and online copy modules 22, 24, while in other implementations, the allocation of functionality between these modules may vary, and in other implementations, the functionality may be incorporated wholly into a computing device 12 or into knowledge system 14.

In various implementations, knowledge system 14 may also include an application module 26, a ranking module 28, an indexing engine 30, and an information engine 32. In some implementations one or more of modules 26, 28 and engines 30, 32 may be omitted. In some implementations all or aspects of one or more of modules 26, 28 and engines 30, 32 may be combined. In some implementations, one or more of modules 26, 28 and engines 30, 32 may be implemented in a component that is separate from knowledge system 14. In some implementations, one or more of modules 26, 28 and engines 30, 32, or any operative portion thereof, may be implemented in a component that is executed by computing device 12.

In various implementations, knowledge system 14 and/or computing device 12 may also include a personal assistant engine (not shown). Further, in some implementations, knowledge system 14 may implement a search engine.

In some implementations, both online and offline functionality may be supported, e.g., such that online functionality is used whenever a computing device 12 is in communication with an online service, while offline functionality is used when no connectivity exists. In other implementations different actions or action domains may be allocated to online and offline functionality, and while in still other implementations, online functionality may be used only when offline functionality fails to adequately handle a particular paste target prediction. In other implementations, however, no complementary online functionality may be used.

Application module 26 may maintain an index of applications installed or otherwise available to computing devices 12. For example, application module 26 may be integral with, or at least in communication with, a so-called "app store" from which users of computing devices 12 download applications (or "apps"). In some implementations, when a user downloads and/or installs an app from application module 26 (or from an app store in communication with application module 26), a record may be added to indicate that the user has that application installed. In some implementations, these records may be periodically synchronized with computing devices 12 to reflect, for instance, when users uninstall apps, when users download and install apps from sources other than an app store available to application module 26, and so forth. As will be described below, application module 26 is one of multiple components depicted in FIG. 1 that can participate in the process of identifying applications that are installed on computing devices 12, so that suitable application predictions may be made.

In some implementations, application module 26 may be accessible by individual users through accounts the users set up. For example, a user may have an account with application module 26 (or with an app store in communication with application module 26) that the user can access using various credentials (e.g., username/password, retinal scan, fingerprint scan, etc.). Once the user is signed in to her account, he or she may download one or more apps to one or more computing devices forming an ecosystem of computing devices operated/owned by the user. In some instances, particular apps may only be available for download on the condition that the user purchase the app (or rights to use the app). In some implementations, when a user purchases an app, the user thereafter may have the right to download and install the app on multiple computing devices 12 of their ecosystem.

It will also be appreciated, however, that some applications that may be predicted in the manner disclosed herein may be "default" applications initially provided with a computing device, and may not be separately installed, and in some instances, may not even be removable by a user. Some applications, e.g., search or translation applications, may also be integrated at least partially into a computing device operating system and thus may not necessarily be displayed to a user in a similar manner to other applications. Some applications, for example, may be displayable as overlays or in other manners that are integrated into an operating system, rather than being displayed in separate application windows.

Indexing engine 30 may maintain an index for use by knowledge system 14. The indexing engine 30 processes documents and updates index entries in the index, for example, using conventional and/or other indexing techniques. For example, the indexing engine 30 may crawl one or more resources such as the World Wide Web and index documents accessed via such crawling. As another example, the indexing engine 30 may receive information related to one or documents from one or more resources such as web masters controlling such documents and index the documents based on such information. A document is any data that is associated with a document address. Documents include web pages, word processing documents, portable document format (PDF) documents, images, emails, calendar entries, videos, and web feeds, to name just a few. Each document may include content such as, for example: text, images, videos, sounds, embedded information (e.g., meta information and/or hyperlinks); and/or embedded instructions (e.g., ECMAScript implementations such as JavaScript).

Information engine 32 may maintain another index that includes or facilitates access to non-document-specific information for use by the knowledge system 14. For example, knowledge system 14 may be configured to return information in response to search queries that appear to seek specific information. If a user searches for "Ronald Reagan's birthday," knowledge system 14 may receive, e.g., from information engine 32, the date, "Feb. 6, 1911." This information may be returned to the user as a part of search results that is separate from documents received from indexing engine 30. In various implementations, the index itself may contain information, or it may link to one or more other sources of information, such as online encyclopedias, almanacs, and so forth. In various implementations, the index of each of engines 30, 32 may include mappings between queries (or query terms) and documents and/or information.

Ranking module 28 may use the indices of engines 30, 32 to identify documents and other information responsive to a search query, for example, using conventional and/or other information retrieval techniques. Ranking module 28 may calculate scores for the documents and other information identified as responsive to a search query, for example, using one or more ranking signals. Each ranking signal may provide information about the document or information itself, the relationship between the document or information and the search query, and/or the relationship between the document or information and the user performing the search.

In some implementations, knowledge system 14 may have, e.g., as part of information engine 32 and/or another component, a so-called knowledge base that contains records of known entities, entity types (e.g., "person," "place," "thing") and relationships between the known entities. In some implementations, such a knowledge base may be implemented as a graph in which nodes represent entities and edges represent relationships between entities and/or entity types, although this is not required. In some such implementations, information about entities from such a knowledge base may be made available to components such as offline copy module 24. Those components may then use the entity information in some implementations to assist in predicting paste target applications, among other purposes.

Other variations and modifications to the environment illustrated in FIG. 1 will be appreciated, and as such, the invention is not limited to the particular environment disclosed herein.

Figure 2:
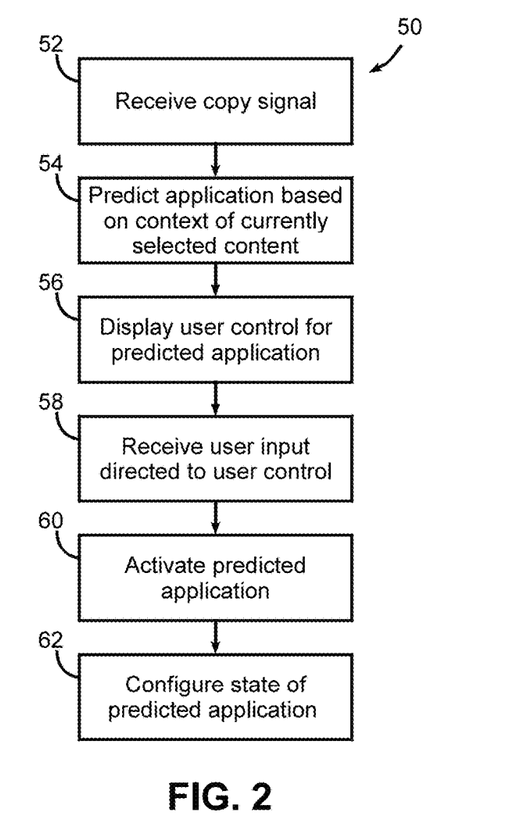
FIG. 2 is a flowchart illustrating an example sequence of operations for performing contextual paste target prediction in the example environment of FIG. 1.

Now turning to FIG. 2, and with continuing reference to FIG. 1, this figure illustrates an example sequence of operations 50 suitable for performing contextual paste target prediction in the computing environment 10 of FIG. 1. Sequence 50 is initiated in response to receipt of a control signal, also referred to herein as a copy signal, in block 52. A control signal, in this regard, may be implemented in a number of manners in different implementations. For example, in some implementations sequence 50 may be registered as a copy listener in operating system 20, whereby the control signal may be considered to be an event message, or function call, and such that the control signal is generated in response to a copy event. In some implementations, e.g., where prediction is performed in an online service such as knowledge system 14, a control signal may be a message communicated from computing device 12 to knowledge system 14 indicating that a copy action has been performed on the computing device, and optionally including the selected and copied content and/or other contextual information suitable for generating a prediction. In still other implementations, a control signal may be generated by a clipboard entity and/or in response to periodic monitoring of a clipboard entity, such that when content is copied onto the clipboard, sequence 50 is initiated.

Other manners of detecting a copy action performed by a user may be used in other implementations. Further, as it will be appreciated that cut actions are effectively copy actions combined with delete actions, the use of the term "copy" herein should also be considered to refer to "cut" as well.

Returning to FIG. 2, once a copy signal is received, block 54 attempts to predict a target application based upon a context of the currently selected (and copied) content, i.e., to predict a predicted application into which the selected content is suitable for pasting from among multiple candidate applications. A context, in this regard, generally refers to a collection of data or signals that may be useful in assessing the likely application(s) into which a user is intending to paste the selected and copied content. In some implementations, for example, the context may include the length of the selected content, such that if the length meets a length threshold (e.g., being greater than a predetermined length), a messaging application such as an email or text message application may be predicted, while if the length does not meet the length threshold, a search application may be predicted. Further, in some implementations, the context may include one or more entities that are identified in the selected content, e.g., email addresses, phone numbers, physical addresses, URLs, such that the prediction of a target application may be based at least in part on the applications that are best suited for those entities (e.g., email application for email address, phone or contact application for phone number, map application for physical address, or browser application for URL).

In addition, in some implementations, the context may include the copy application, i.e., the application in which the user action to copy the selected content was performed, as the copy application may be relevant both for the purpose of excluding that application as a predicted target application and/or biasing a prediction towards applications that have been previously found to have been activated after a copy action has been performed in the copy application.

In some implementations, the context may also include an application history that may provide additional clues as to a user's intent. For example, the application history may include one or more recently-used applications, as a user may be intending to return to a recently-used application to paste the selected content. The application history may also include one or more previously-targeted applications, i.e., applications that have previously been targeted for paste actions, and in some instances, applications that have been previously targeted for similar content, such as for the same user, for selected content copied from the same copy application, or for selected content of a particular type. The application history may also include one or more previously-activated applications, i.e., applications that have previously been activated subsequent to prior copy actions, both in general and with respect to the particular application from which the copy action was initiated.

In some implementations, an application history may also include history data associated with user actions performed after prior predictions. For example, if a user previously performed a paste action in the same application in which the copy action was performed rather than activating a predicted application, if a user performed certain behaviors after activating a predicted application, e.g., editing the pasted text, that information may be used in a prediction algorithm, and in some instances, may be used as feedback to improve the prediction algorithm for further predictions.

In addition, in some implementations, no application may be predicted, e.g., due to no application being predicted with at least a baseline level of confidence. In such situations, a default application, e.g., a search application, may be returned as a result of a prediction.

Various prediction algorithms and approaches may be utilized to predict an application. In some implementations, for example, machine learning algorithms may be employed, and may weight different aspects of a context differently such that different applications are predicted in response to different combinations of data in a particular context. In some implementations, certain aspects of a context may be prioritized over others such that if some aspect of a context meets some threshold criterion, other aspects are not considered in a prediction. Application predictions may be based solely on a user's personal history in some implementations, while in other implementations, the histories of multiple users may be used to predict target applications for other users. In addition, in situations in which the systems described herein collect personal information about users, or may make use of personal information, the users may be provided with an opportunity to control whether programs or features collect user information (e.g., information about a user's social network, social actions or activities, profession, a user's preferences, or a user's current geographic location), or to control whether and/or how to receive content that may be more relevant to the user. Also, certain data may be treated in one or more ways before it is stored or used, so that personal identifiable information is removed. For example, a user's identity may be treated so that no personal identifiable information can be determined for the user, or a user's geographic location may be generalized where geographic location information is obtained (such as to a city, ZIP code, or state level), so that a particular geographic location of a user cannot be determined. Thus, the user may have control over how information is collected about the user and/or used.

A result of a prediction may be the identification of a predicted target application for the copied content in some implementations. In some implementations, the result of a prediction may be multiple predicted target applications, and in some implementations, the multiple predicted target applications may be ranked, with the highest ranked application being the predicted most likely target. Further, in some implementations predictions may be limited to applications that are actually installed on a computing device, while in other implementations, applications may be automatically installed once predicted, or a user may be given the option of installing an application in response to a prediction.

Next, in block 56, a user control for the predicted application, or if multiple applications are predicted, the highest ranked or most likely predicted application, is displayed on the computing device. The user control is configured to activate the predicted application on the computing device upon user selection, and as such, block 58 illustrates the receipt of such user input directed to the user control. In response to the user input, block 60 then activates the predicted application.

In addition, in some implementations, and as illustrated by block 62, the state of the predicted application may also be configured to facilitate pasting or otherwise using the selected (and copied) content. For example, in some implementations, where it is predicted that the content is to be pasted into a search box of a predicted application, a display including the search box may be opened, and in some implementations, the content may be pasted into the search box and/or the search may be automatically initiated. It will be appreciated that how an application is configured may vary widely for different applications, and as such, different implementations may perform a wide variety of operations to configure a predicted application to receive and/or otherwise use the content.

In some implementations, for example, "deep" links may be used to both activate an application and configure the state of the application. In some implementations, for example, a link may be operable by a user to cause a computing device to expose to the user a specified interface associated with a predicted application. For example, if a predicted application is running in the background (e.g., already loaded in some form into volatile memory), then operation of the link may cause the application to be made active so that the user is exposed to, and hence can interact with, an interface (graphical, audible, haptic, etc.) of the application. If the application is installed but not running in the background, then operation of the link may cause the application to be opened or "launched," e.g., from nonvolatile memory.

Thus, upon completion of sequence 50, the user, having copied selected content, is directed to a predicted target application for pasting or otherwise using the selected content in the predicted target application.

Sequence 50 may be implemented solely within a computing device, solely within knowledge system 14, or using a combination thereof. It will be appreciated that display of a user control on a computing device may therefore be initiated in a computing device, or may be initiated in knowledge system 14, with the return of a predicted target application causing the user control to be displayed on the computing device.

Figure 3:
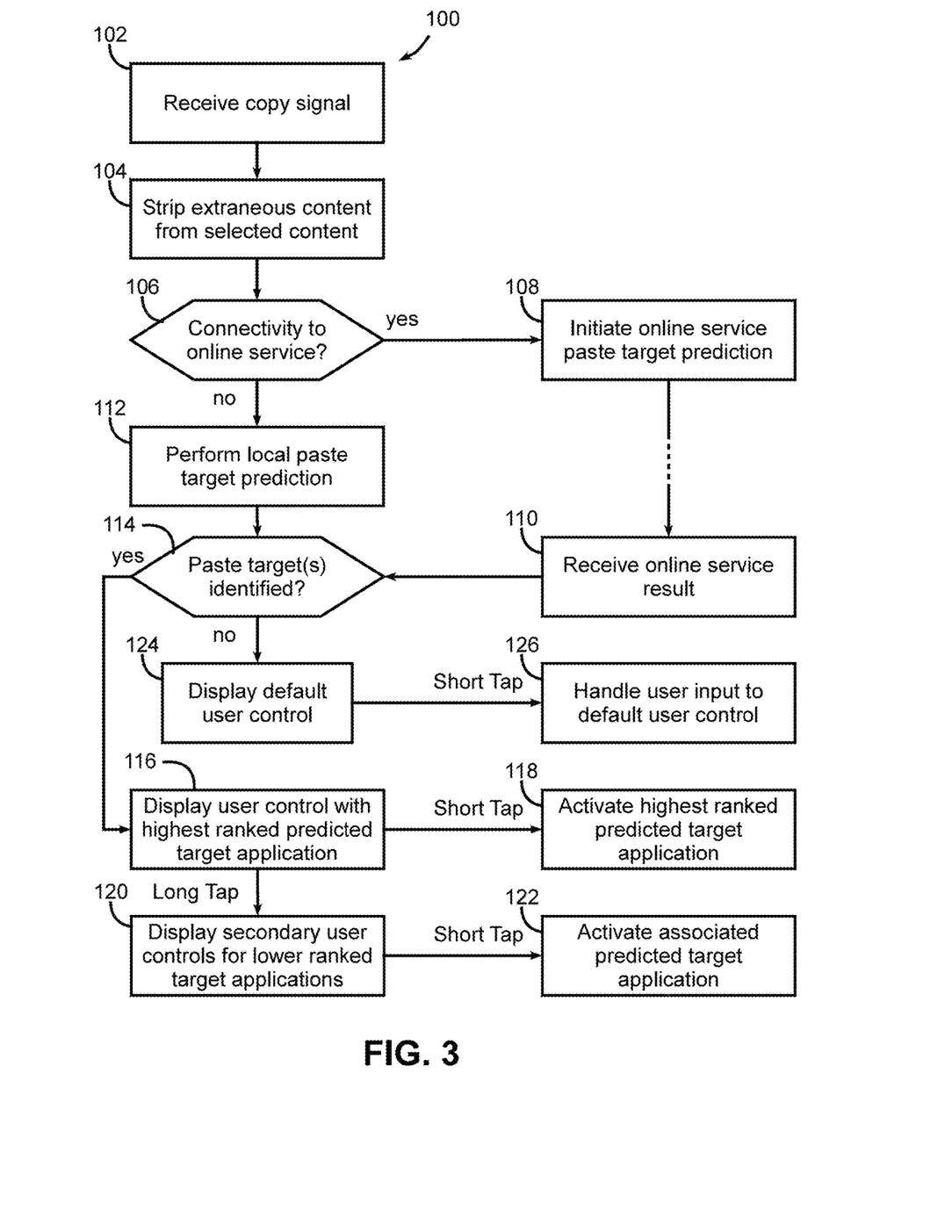
FIG. 3 is a flowchart illustrating another example sequence of operations for performing contextual paste target prediction in the example environment of FIG. 1.

FIG. 3 illustrates another example sequence of operations 100 suitable for performing contextual paste target prediction, and specifically in a distributed fashion utilizing both local copy module 22 of computing device 12 and online copy module 24 of knowledge system 14 (FIG. 1). Blocks 102-126 are implemented in computing device 12, and begin with block 102 by receiving a copy or control signal generated in response to a copy action initiated by a user. Next, in block 104, extraneous content, e.g., attributions added to the selected content on a copy buffer or clipboard by the copying application, may be stripped from the selected content.

Block 106 next determines if connectivity exists to the online service (i.e., computing device 12 is in communication with knowledge system 14). If so, control may pass to block 108 to initiate online service paste target prediction, e.g., by constructing and sending a message including the selected content and any relevant context data, and in some instances, a list of installed applications on the computing device (unless already known to application module 26). The computing device awaits a response message from the online service including the prediction result, which is received in block 110. Returning to block 106, if no connectivity to the online service is available, however, block 106 passes control to block 112 to perform local paste target prediction.

In this implementation, both the local paste target prediction in block 112 and the online service paste target prediction initiated in block 108 return a ranked list of zero or more predicted applications. In some implementations, the list may be provided as a set of cards identifying predicted applications, relative rankings, and associated deep links suitable for activating the respective applications, and in some instances, configuring the states of those applications to optimally use the selected and copied content. As such, each of blocks 110 and 112 pass control upon completion to block 114 to determine whether any paste targets have been identified (i.e., the list is not empty).

If one or more paste targets have been found, control passes to block 116 to display a user control for the highest ranked predicted target application in the list. In addition, in this implementation the user control is subject to multiple types of user input. A first type of user input, for example, corresponds to a short tap on a touch screen, and causes control to pass to block 118 to activate the highest ranked predicted target application, e.g., using the deep link provided in the list of results. A second type of user input corresponds to a long tap on a touch screen, and causes control to pass to block 120 to display one or more secondary user controls corresponding to some or all of the lower ranked predicted target applications in the list. It will be appreciated, however, that other types of user input may be used to initiate the display of secondary user controls in other implementations. In addition, in some implementations, additional user controls corresponding to one or more default applications or operations may also be provided (e.g., if there are more available locations than predicted target applications). Each of these secondary user controls is also subject to one or more types of user input. As shown in block 122, for example, a short tap to one of these secondary user controls may activate the predicted target application associated with the selected secondary user control.

Returning to block 114, if the result list is empty, control passes to block 116 to display a default user control, e.g., a share user control that allows a user to share or save the content, and a short tap or other user input causes control to pass to block 126 to handle the user input as appropriate. As with the user control displayed for a highest ranked predicted target application, the default user control may also be subject to other types of user input, e.g., a long tap to display multiple secondary user controls, e.g., various note-taking applications such as a text messaging application, an email application, a note application, a search application, etc.

It will be appreciated that other types of user input may be supported, e.g., a swipe gesture to close or hide a user control, among others. User controls may also be automatically hidden after a predetermined period of time in some implementations. Further, in some implementations user controls may be hidden or grayed out/deactivated when no network connectivity exists and the associated applications require connectivity to operate (e.g., a search application).

Figure 4:
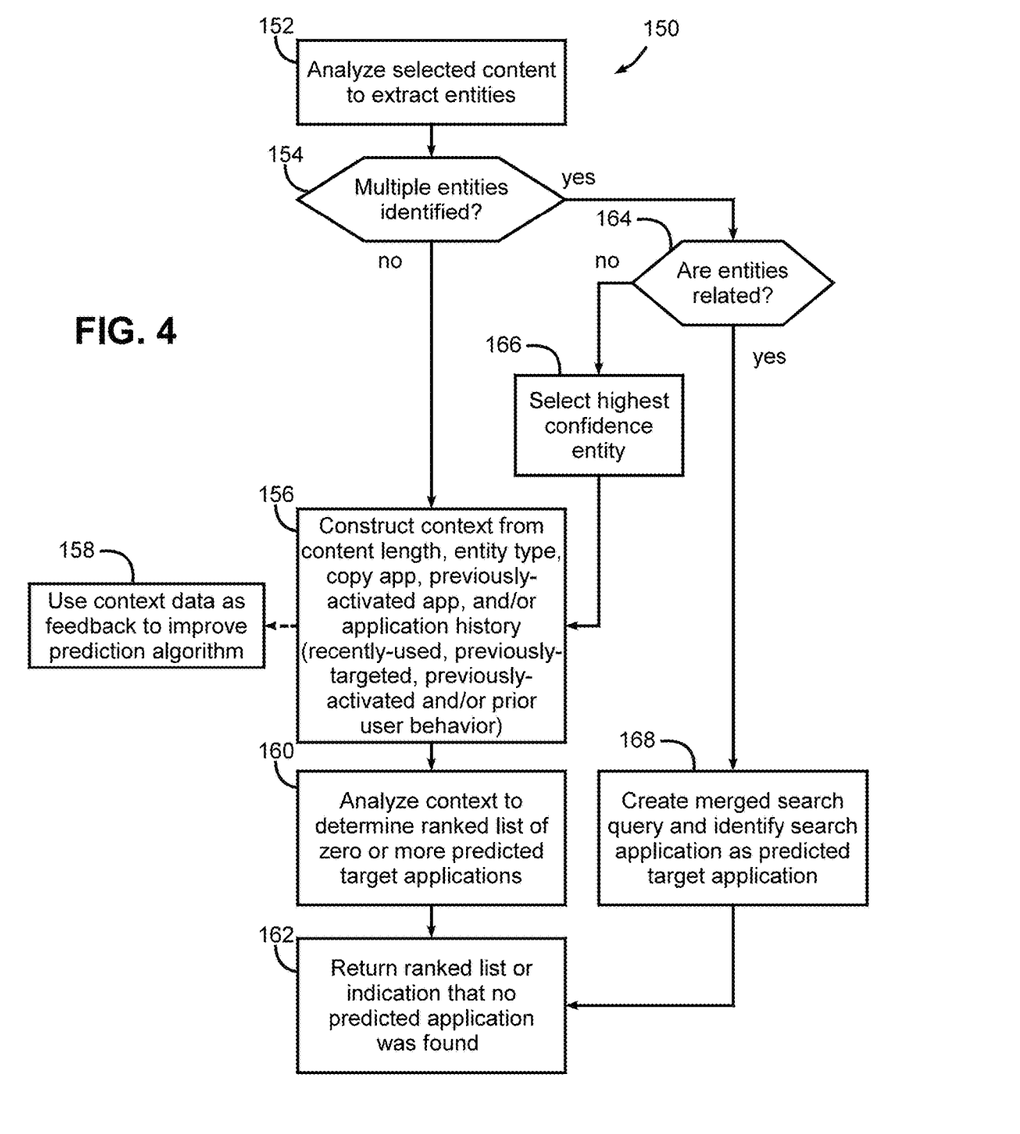
FIG. 4 is a flowchart illustrating an example sequence of operations for predicting and ranking target applications based upon a context in the example environment of FIG. 1.

Now turning to FIG. 4, this figure illustrates an example sequence of operations 150 for predicting and ranking target applications based upon a context for use in some implementations. Sequence 150 may be used, for example, to perform local paste target prediction (block 112 of FIG. 3) and/or to perform online service paste target prediction (e.g., in online copy module 24 of FIG. 1). It will be appreciated that in some implementations, both the local and online paste target prediction may incorporate similar functionality and capability, while in other implementations, the local paste target prediction may incorporate reduced capability relative to the online service, such that the online service provides primary prediction functionality and local paste target prediction is used only when no connectivity to the online service exists.

Sequence 150 begins in block 152 by analyzing the selected content to extract zero or more entities. An entity, in this regard, is a recognized type of content for which one or more associated applications exist. For example, with text content, analysis of the text may identify an email address, which may be associated with an email or contact application, a phone number, which may be associated with a phone or contact application, a physical address, which may be associated with a map or contact application, or a Uniform Resource Locator (URL), which may be associated with a browser application. For other types of content, e.g., image data, image analysis and/or optical character recognition may be performed to identify one or more entities. It should also be noted that some entities may be pre-categorized, e.g., as is performed by some messaging applications that generate selectable links for emails, phone numbers, addresses and/or URLs. In other implementations, however, text entities may be identified in block 152 from raw text.

Block 154 next determines whether multiple entities were identified, and if not, control passes to block 156 to construct a context from various data associated with the selected content, including one or more of: content length, entity type (e.g., email address, phone number, physical address, URL, etc.), copy application (the application from which the selected content was copied), previously-activated application (the application that was activated immediately prior to the copy application, since the user may wish to return to the prior application), and application history (including recently-used applications, previously-targeted applications, previously-activated applications and/or user behavior).

Further with regard to the application history, it will be appreciated that historical activities both with respect to prior copy and paste actions as well as user actions occurring immediately prior to the current copy action may be indicative of a user's intent for future paste actions, and in some instances may even be predictive as to how a target application should be configured to facilitate use of the selected content. Thus, for example, if a user has previously opened a new message in an email application and/or has pasted content into an open message in an email application and the previously pasted content was copied from a web page open in a browser application, each of these factors may be considered part of the context for a subsequent copy action in the browser application. Further, as a result of this context, contextual paste target prediction may predict the browser application as the predicted application, and in some instances, may configure the state of the browser application upon activation by the user to display the message, and in some instances, paste the content into the message at a prior cursor location. The application history may be obtained in a number of manners, e.g., by monitoring active tasks in a computing device, among others.

In addition, as illustrated by block 158, the information in a context may also be provided as feedback to a prediction algorithm to enable the prediction algorithm to be improved. Thus, for example, if a user previously performed a paste action in the same application in which the copy action was performed rather than activating a predicted application, or if a user performed certain behaviors after activating a predicted application, e.g., editing the pasted text, that information may be used to modify the response of the prediction algorithm to reduce the likelihood of mispredictions and/or misconfiguration of predicted applications.

Returning to block 156, once a context is constructed, control passes to block 160 to analyze the context to determine a ranked list of zero or more predicted target applications, e.g., a set of predicted target applications having a confidence level above a cut-off threshold, and ranked by confidence level. In addition, the copy application will generally be excluded from the results. The prediction algorithm used in block 160 may be configured in a wide variety of manners in different implementations, and as noted above, may be adaptive based upon feedback. A prediction algorithm may be based on machine learning techniques, fuzzy logic or other techniques to effectively map applications to various context data, and a prediction algorithm may be customized for an individual user and be based only on context data associated with that user, or alternatively may be based upon the context data of multiple users in some implementations such that the historical activities of users may be used in the prediction of target applications for other users. It will also be appreciated that block 160 may also have access to the user's set of installed applications such that only applications that are currently available on a user's computing device will be returned in the results. In other implementations, however, non-installed applications may also be returned as results such that the user can have the option to install those applications if desired.

Next, in block 162, the ranked list is returned as a result of the prediction, or if no predicted application was identified having a sufficient confidence level, an indication that no predicted application was found may be returned. In addition, in some implementations the results may also include suggested commands for predicted applications to properly configure the applications to use the selected content. In some implementations, for example, the results may be returned using an ordered list of deep links, with each deep link identifying an application and a command suitable for configuring the application in a desired state. In some implementations, the results may be returned as an ordered set of "cards" including deep links. Other manners of formatting the results may be used in other implementations.

Returning now to block 154, if multiple entities are identified from analysis of the selected content, control may be passed to block 164 to determine if the entities are related, e.g., if there is some indication that the multiple entities are intended to be used together, or if the multiple entities are unrelated and thus the user was likely only intending to copy one entity and later remove the content related to other entities. The relatedness may be determined, for example, based upon the likelihood that the entities are often searched together. If not, control passes to block 166 to select the highest confidence entity and pass control to block 156 to use that entity in the context for the purposes of contextual paste target prediction. Otherwise, block 164 passes control to block 168 to create a merged search query and identify the search application as the highest confidence predicted target application, and then to block 162 to return the search application as the result of the prediction, thereby enabling a user to initiate a search using the multiple entities. In other implementations, entities that are unrelated and/or related may be used to generate separate predictions for each entity that may then be combined and displayed to a user, e.g., in an overlay display.

As noted above, sequence 150 may be used for both local and online contextual paste target prediction. In addition, in some implementations, the functionality may vary between local and online prediction. Thus, for example, it may be desirable in some implementations for local contextual paste target prediction to only process a subset of the context data, as well as to limit the prediction to only offline-capable applications when no connectivity exists. Thus, for example, in some implementations, local contextual paste target prediction may be restricted to detecting entities such as email addresses, phone numbers, physical addresses and/or URLs, and potentially relying on limited application history such as the most recently activated application to enable a user to quickly return to the last application they were using. Further, when offline the applications presented to a user may be restricted, e.g., to only display a user control for a map application if offline maps are available. In still other implementations, if no connectivity exists, a default user control may be displayed.

Figure 5A:
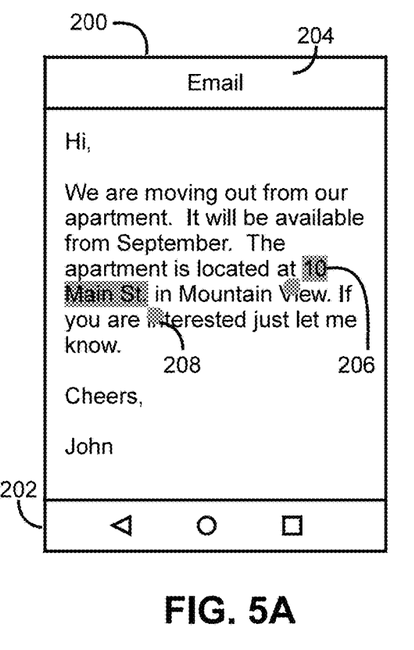
FIGS. 5A, 5B, 5C, and 5D graphically illustrate an example implementation of contextual paste target prediction on a computing device from the example environment of FIG. 1.
Figure 5B:
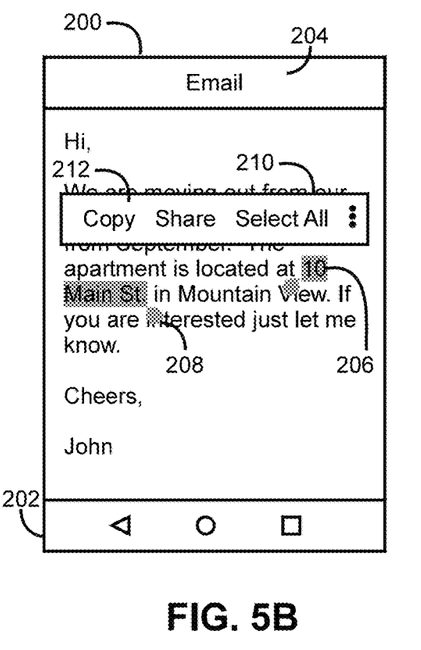

Now turning to FIGS. 5A-5D, these figures illustrate a graphical example of the operation of contextual paste target prediction in one implementation. FIG. 5A, for example, illustrates a computing device 200, e.g., a mobile phone, including a display illustrating a control bar 202 and an email application 204, within which is displayed an email message. Also shown in FIG. 5A, a user has selected text in the body of the email message ("10 Main St."), with the selected text highlighted as illustrated at 206. Selection of the text may occur in various manners, e.g., by dragging controls 208 delimiting the beginning and end of the selection. As is illustrated in FIG. 5B, upon completion of the selection of text (e.g., once a user has picked up his or her finger after dragging one of controls 208), a context menu or bar 210 may be displayed adjacent the selected text. Context bar 210 may include a number of buttons or other controls, including a copy button 212 that, once selected by a user (e.g., via a short tap), initiates a copy action to copy the selected text to the clipboard.

Figure 5C:
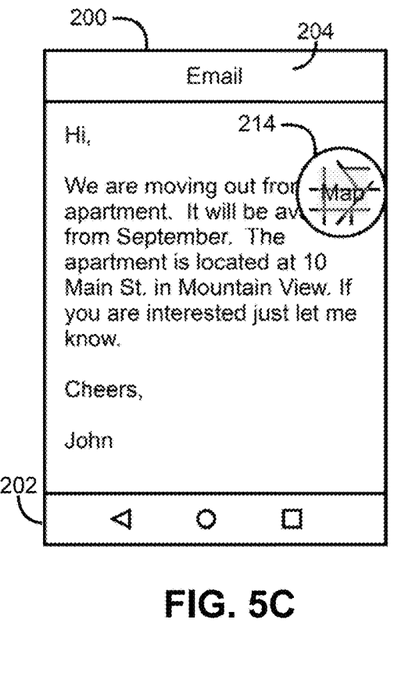
Figure 5D:
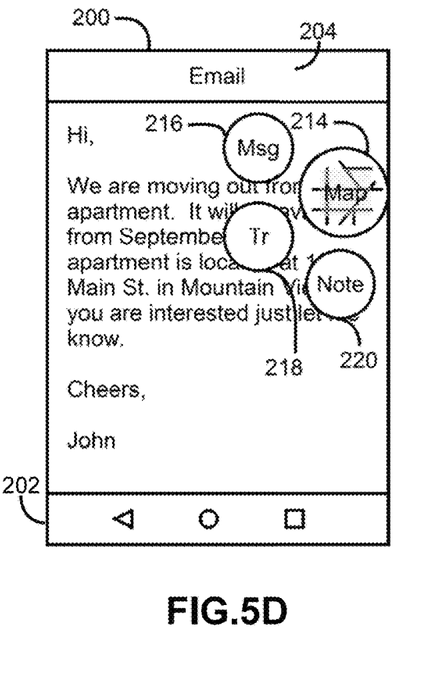

In this example, the initiation of the copy action also initiates contextual paste target prediction. It is assumed for the purposes of this example that the text "10 Main St." is identifiable as a physical address during entity analysis of the text, and thus from this context a map application may be predicted as the highest confidence predicted target. As such, and as illustrated in FIG. 5C, initiation of the copy action may cause a user control 214, taking the form of a "bubble," to be displayed along an edge of the display. User control 214 is configured to, when selected via a short tap by a user, open the map application, and in some instances, initiate a search using the "10 Main St." Furthermore, as illustrated in FIG. 5D, a second type of user input directed to user control 214, e.g., a long tap, may result in the display of one or more secondary user controls corresponding to other, lower confidence predicted target applications (e.g., user controls 216, 218 and 220 corresponding respectively to a message application, a translation application and a note application). Secondary user controls 216-220 may be displayed as "satellites" circumscribing user control 214 in some implementations, while in other implementations, the secondary user controls may be displayed in other locations relative to user control 214, e.g., vertically or linearly arranged along the edge below user control 214. In other implementations, rather than displaying the secondary user controls only after user input directed to user control 214, some or all of the secondary user controls may also be displayed at the same time as user control 214 so that a user is initially presented with multiple predictions in response to a copy action. In addition, it will be appreciated that in some implementations, initiation of a copy action may not cause the selected text to become deselected as illustrated in FIGS. 5C and 5D, and as such, the text may still be selected after display of any of user controls 214-220.

Figures 6A, 6B:
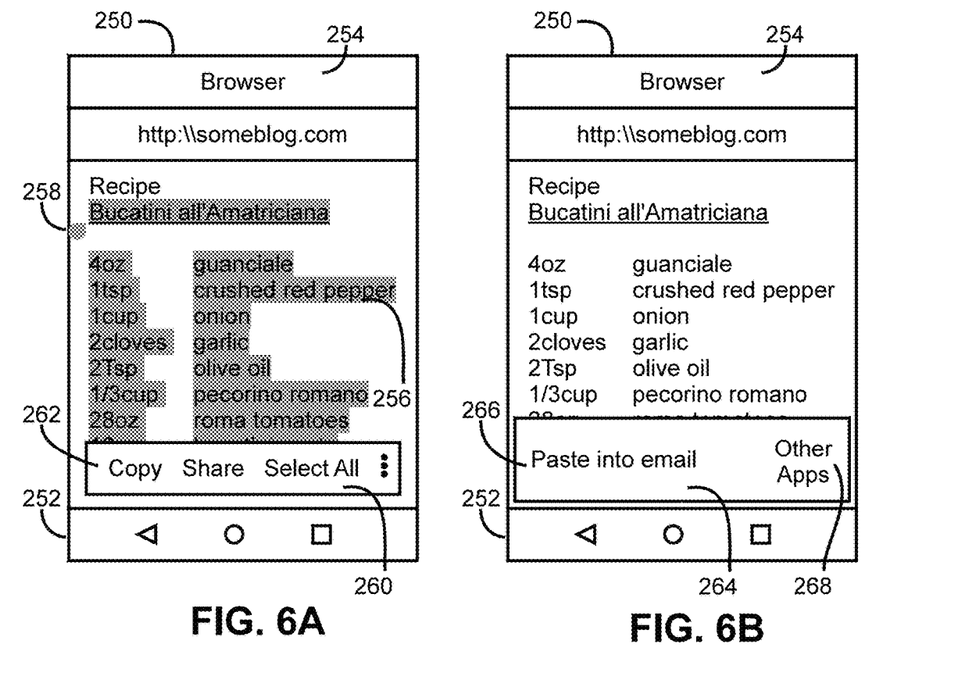
FIGS. 6A, 6B, 6C, and 6D graphically illustrate another example implementation of contextual paste target prediction on a computing device from the example environment of FIG. 1.

FIGS. 6A-6D next illustrate a graphical example of the operation of contextual paste target prediction in another implementation. FIG. 6A, for example, illustrates a computing device 250, e.g., a mobile phone, including a display illustrating a control bar 252 and a browser application 254, within which is displayed a web page of recipes. Also shown in FIG. 6A, a user has selected text for a recipe (for Bucatini all'Amatriciana), with the selected text highlighted as illustrated at 256. Upon completion of the selection of the text, a context menu or bar 260 may be displayed adjacent the selected text, including a copy button 262 that, once selected by a user (e.g., via a short tap), initiates a copy action to copy the selected text to the clipboard.

In this example, the initiation of the copy action also initiates contextual paste target prediction, and based at least in part on the fact that the text is greater than a length threshold, the prediction may favor a messaging application over a search application. In addition, assuming, for example, that the previously-activated application was an email application, an email application may be favored over another type of messaging application, e.g., a text messaging application. Thus, as illustrated in FIG. 6B, initiation of the copy action may cause a card 264 to be displayed at the bottom of the display, and including a user control 266, e.g., a button, corresponding to the predicted application.

Figures 6C, 6D:
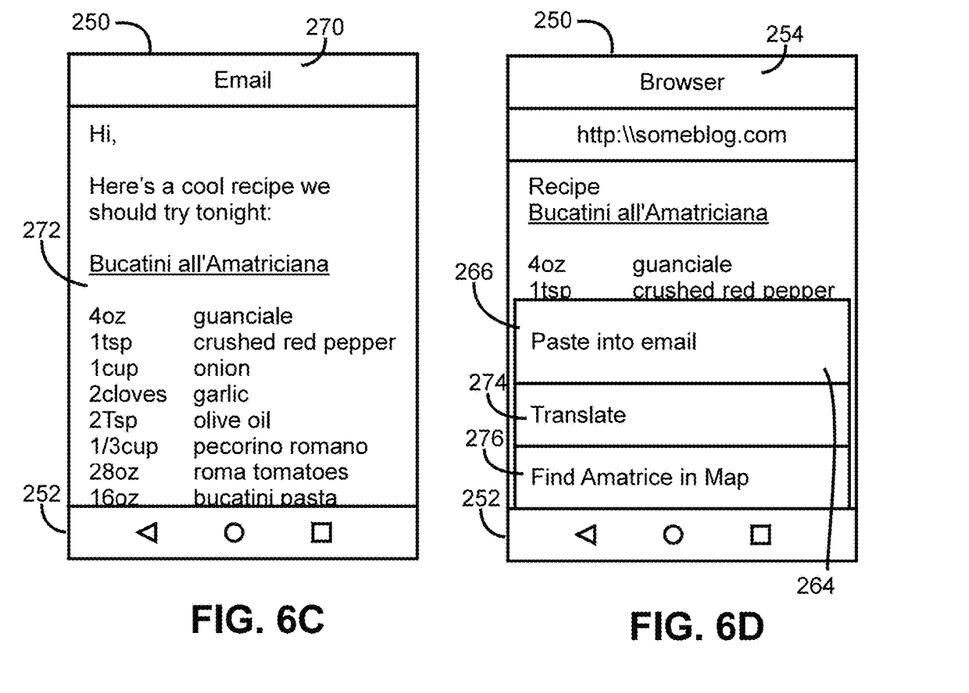

As illustrated in FIG. 6C, selection of user control 266 may result in activation of an email application 270, and as illustrated at 272, the email application 270 may be configured to display a new or previously-opened draft email and paste the selected content at a current cursor location in the new or previously-opened draft email, e.g., as a result of a deep link associated with user control 266 of FIG. 6B. In other implementations, only the new or previously-opened draft email may be displayed as a result of selecting user control 266, while in other implementations, only email application 270 may be activated as a result of selecting user control 266. In addition, in some implementations, where content is automatically pasted into a predicted application or the content is otherwise automatically used in an operation in the predicted application, a user may be prompted for a confirmation (not shown) to enable the user to quickly undo the automatically-performed operation.

Returning briefly to FIG. 6B, card 264 may also include a user control 268 to display other, lower ranked predicted applications. Selection of user control 268 is illustrated in FIG. 6D, where additional cards 274 and 276 are displayed corresponding to other predicted applications, e.g., to activate a translation application (optionally as an overlay) using card 274 or to activate a map application to find Almatrice on a map (determined from text analysis of the selected content).

Figure 7:
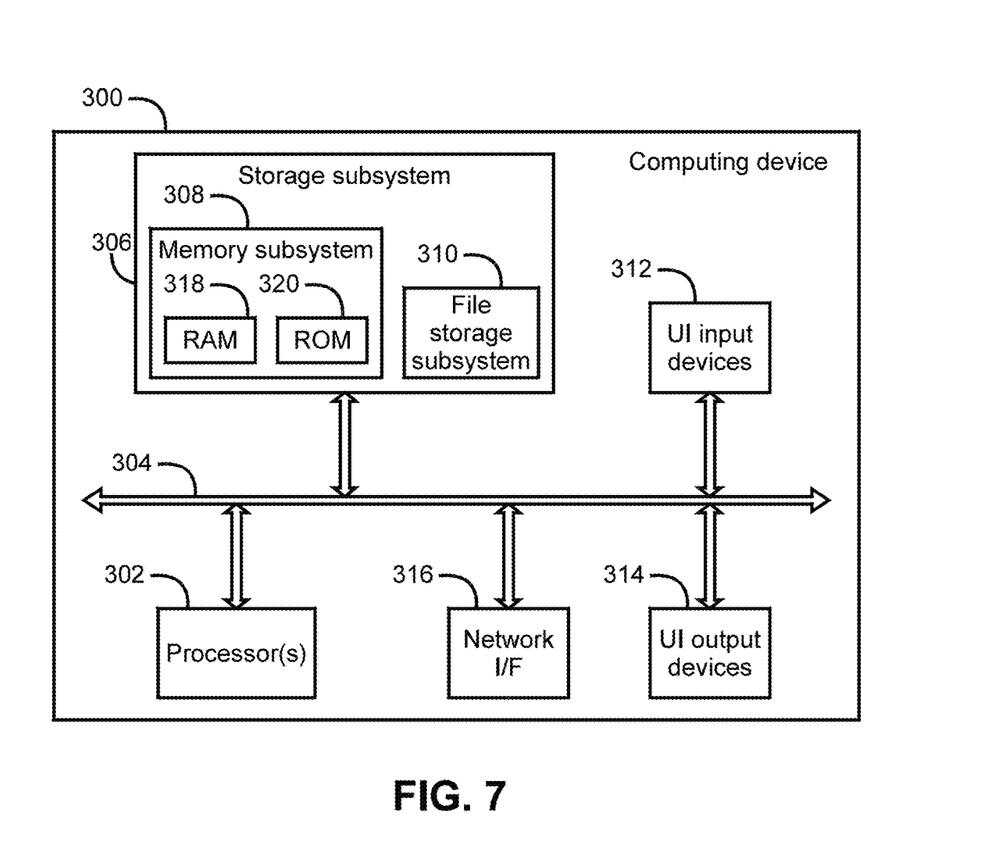
FIG. 7 illustrates an example architecture of a computer suitable for implementing one or more devices in the example environment of FIG. 1.

The herein-described techniques may be implemented in a number of different computers, computer systems, or computing devices in various implementations. FIG. 7, for example, is a block diagram of an example computer 300 that may be used to implement a computing device, knowledge system and/or various computer systems within a computing environment. Computer 300 typically includes at least one processor 302 which communicates with a number of peripheral devices via a bus subsystem 304. These peripheral devices may include a storage subsystem 306, including, for example, a memory subsystem 308 and a file storage subsystem 310, user interface (UI) input devices 312, UI output devices 314, and a network interface subsystem 316. The input and output devices allow user interaction with computer 300, and network interface subsystem 316 provides an interface to outside networks and is coupled to corresponding interface devices in other computers.

User interface input devices 312 may include a keyboard, pointing devices such as a mouse, trackball, touchpad, or graphics tablet, a scanner, a touchscreen incorporated into the display, audio input devices such as voice recognition systems, microphones, and/or other types of input devices. In general, use of the term "input device" is intended to include all possible types of devices and ways to input information into computer 300 or onto a communication network.

User interface output devices 314 may include a display subsystem, a printer, a fax machine, or non-visual displays such as audio output devices. The display subsystem may include a cathode ray tube (CRT), a flat-panel device such as a liquid crystal display (LCD), a projection device, or some other mechanism for creating a visible image. The display subsystem may also provide non-visual display such as via audio output devices. In general, use of the term "output device" is intended to include all possible types of devices and ways to output information from computer 300 to the user or to another machine or computer system.

Storage subsystem 306 stores programming and data constructs that provide the functionality of some or all of the modules described herein. For example, the storage subsystem 306 may include the logic to perform selected aspects of the aforementioned sequences of operations and/or to implement one or more components of the various devices and environments illustrated in FIG. 1.

These software modules are generally executed by processor 302 alone or in combination with other processors. Memory subsystem 308 used in the storage subsystem 306 can include a number of memories including a main random access memory (RAM) 318 for storage of instructions and data during program execution and a read only memory (ROM) 320 in which fixed instructions are stored. A file storage subsystem 310 can provide persistent storage for program and data files, and may include a hard disk drive, a floppy disk drive along with associated removable media, a CD-ROM drive, an optical drive, or removable media cartridges. The modules implementing the functionality of certain implementations may be stored by file storage subsystem 310 in the storage subsystem 306, or in other machines accessible by the processor(s) 302.

Bus subsystem 304 provides a mechanism for allowing the various components and subsystems of computer 300 to communicate with each other as intended. Although bus subsystem 304 is shown schematically as a single bus, alternative implementations of the bus subsystem may use multiple busses.

Computer 300 can be of varying types including a mobile computing device, desktop computer, laptop computer, tablet computer, wearable computer, workstation, server, computing cluster, blade server, server farm, or any other data processing system or computing device. Due to the ever-changing nature of computers and networks, the description of computer 300 depicted in FIG. 7 is intended only as a specific example for purposes of illustrating some implementations. Many other configurations of computer 300 are possible having more or fewer components than the computer system depicted in FIG. 7.

While several implementations have been described and illustrated herein, a variety of other means and/or structures for performing the function and/or obtaining the results and/or one or more of the advantages described herein may be utilized, and each of such variations and/or modifications is deemed to be within the scope of the implementations described herein. For example, while the illustrated implementations perform both the prediction of predicted applications and the display of a user control corresponding to a predicted application directly in response to a copy action, in some implementations at least portions, if not all, of the prediction may be performed prior to initiation of a copy action, e.g., once content has been selected, such that upon initiation of a copy action, prediction results are available more quickly for use in generating one or more appropriate user controls for display to a user. It will also be appreciated that the various sequences of operations illustrated herein may vary in other implementations, and that operations may be reordered and/or performed in parallel with one another in some implementations. For example, in some implementations some or all of the functionality in block 156 of FIG. 4 may be performed prior to block 152 and/or block 154 such that at least a portion of a context is constructed prior to extracting entities from the selected content.

More generally, all parameters, dimensions, materials, and configurations described herein are meant to be exemplary and that the actual parameters, dimensions, materials, and/or configurations will depend upon the specific application or applications for which the teachings is/are used. Those skilled in the art will recognize, or be able to ascertain using no more than routine experimentation, many equivalents to the specific implementations described herein. It is, therefore, to be understood that the foregoing implementations are presented by way of example only and that, within the scope of the appended claims and equivalents thereto, implementations may be practiced otherwise than as specifically described and claimed. Implementations of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the scope of the present disclosure.

What is claimed is:

1. A method, comprising:
receiving a control signal initiated in response to a user action to copy selected content on a computing device;

using at least one processor, predicting a predicted application into which the selected content is suitable for pasting from among a plurality of applications based upon a context associated with the selected content,
  wherein the context includes a given application in which the user action to copy the selected content is performed, a type of the selected content, and a length of the selected content, and
  wherein, when the length of the selected content meets a length criterion, predicting the predicted application includes:
    predicting a first type of applications, from among a plurality of types of applications, the first type of applications including at least a first application and a second application; and
    predicting, as the predicted application, the first application over the second application, wherein predicting the first application over the second application is based on the first application being previously-activated or previously-targeted in response to a previous user action to copy previously selected content;
  wherein, when the length of the selected content does not meet the length criterion, predicting the predicted application includes:
    predicting a second type of applications, from among the plurality of types of applications; and
    predicting, as the predicted application, a given application, that is of the second type of applications; and
  in response to the control signal, and using at least one processor, causing a user control for the predicted application to be displayed on the computing device, the user control configured to, upon user selection, activate the predicted application on the computing device.

2. The method of claim 1, wherein predicting the predicted application further includes predicting the predicted application based at least in part on in which application the user action to copy the selected content is performed.

3. The method of claim 1, wherein predicting the predicted application further includes predicting the predicted application based upon the predicted application being recently used.

4. The method of claim 1, wherein predicting the predicted application is further based on data indicating that a user previously completed a paste action instead of selecting a user control for a previously-predicted application or indicating further user behavior after activating a previously-predicted application, and wherein predicting the predicted application is based at least in part on the data.

5. The method of claim 1, further comprising analyzing the selected content to identify one or more entities, wherein the context further includes the one or more entities, and wherein predicting the predicted application includes predicting the predicted application based at least in part on one or more of the entities.

6. The method of claim 5, wherein the one or more entities includes an email address, a phone number, a physical address, or a Uniform Resource Locator (URL), and wherein predicting the predicted application includes:
  predicting the predicted application as an email application if the one or more entities includes an email address;
  predicting the predicted application as a phone application if the one or more entities includes a phone number;
  predicting the predicted application as a map application if the one or more entities includes a physical address; and
  predicting the predicted application as a browser application if the one or more entities includes a URL.

7. The method of claim 5, wherein predicting the predicted application further includes:
  determining if multiple entities among the one or more entities are related;
  if the multiple entities are related, predicting a search application as the predicted application; and
  if the multiple entities are not related, selecting a highest ranked entity among the multiple entities and predicting the predicted application based at least in part on the highest ranking entity.

8. The method of claim 1, wherein the user control is displayed along an edge of a display screen of the computing device, wherein the user control is configured to activate the predicted application on the computing device in response to a first user input type, and wherein the user control is configured to cause a plurality of secondary user controls to be displayed adjacent to the user control in response to a second user input type, each of the secondary user controls configured to activate an associated additional application upon user selection.

9. The method of claim 1, wherein the user control is further configured to control the predicted application to configure the predicted application into a predetermined state and perform a paste action using the selected content.

10. The method of claim 9, wherein the user control includes a deep link targeting the predicted application.

11. The method of claim 1, wherein the at least one processor is resident in the computing device, and wherein receiving the control signal includes detecting a copy event on the computing device.

12. The method of claim 1, wherein the at least one processor is resident in an online service in communication with the computing device over a network, and wherein receiving the control signal includes receiving a message from the computing device.

13. The method of claim 12, further comprising:
  detecting a copy event on the computing device;
  determining connectivity between the computing device and the online service;
  in response to determining connectivity between the computing device and the online service, communicating the message to the online service; and
  in response to determining a lack of connectivity between the computing device and the online service:
    predicting a locally-predicted application from among the plurality of applications based upon the selected content; or
    causing a default user control to be displayed on the computing device.

14. A system comprising one or more processors and memory storing instructions that, when executed by the one or more processors, cause the one or more processors to:
  receive a control signal initiated in response to a user action to copy selected content on a computing device;
  predict a predicted application into which the selected content is suitable for pasting from among a plurality of applications based upon a context associated with the selected content,
    wherein the context includes a given application in which the user action to copy the selected content is performed, a type of the selected content, and a length of the selected content, and wherein, when the length of the selected content meets a length criterion, predicting the predicted application causes the one or more processors to:
predict a first type of applications, from among a plurality of types of applications, the first type of applications including at least a first application and a second application; and
predict, as the predicted application, the first application over the second application based on the first application being previously-activated or previously-targeted in response to a previous user action to copy previously selected content;
wherein, when the length of the selected content does not meet the length criterion, predicting the predicted application causes the one or more processors to:
predict a second type of applications, from among the plurality of types of applications; and
predict, as the predicted application, a given application, that is of the second type of applications; and
in response to the control signal, cause a user control for the predicted application to be displayed on the computing device, the user control configured to, upon user selection activate the predicted application on the computing device.

15. At least one non-transitory computer-readable medium comprising instructions that, in response to execution of the instructions by one or more processors, cause the one or more processors to:
receive a control signal initiated in response to a user action to copy selected content on a computing device;
predict a predicted application into which the selected content is suitable for pasting from among a plurality of applications based upon a context associated with the selected content,
wherein the context includes a given application in which the user action to copy the selected content is performed, a type of the selected content, and a length of the selected content, and
wherein, when the length of the selected content meets a length criterion, predicting the predicted application causes the one or more processors to:
predict a first type of applications, from among a plurality of types of applications, the first type of applications including at least a first application and a second application; and
predict, as the predicted application, the first application over the second application based on the first application being previously-activated or previously-targeted in response to a previous user action to copy previously selected content;
wherein, when the length of the selected content does not meet the length criterion, predicting the predicted application causes the one or more processors to:
predict a second type of applications, from among the plurality of types of applications; and
predict, as the predicted application, a given application, that is of the second type of applications; and
in response to the control signal, cause a user control for the predicted application to be displayed on the computing device, the user control configured to, upon user selection, activate the predicted application on the computing device.

16. A method, comprising:
responding to a control signal resulting from a user input to copy selected content on a computing device by:
selecting from a plurality of applications, a content paste target application as a predicted application based upon a context associated with the selected content,
wherein the context includes a given application in which the user action to copy the selected content is performed, a type of the selected content, and a length of the selected content, and
wherein predicting the predicted application includes:
when the length of the selected content meets a length criterion:
predicting a first type of applications, from among a plurality of types of applications, the first type of applications including at least a first application and a second application, and
predicting, as the predicted application, the first application over the second application, wherein predicting the first application over the second application is based on the first application being previously-activated or previously-targeted in response to a previous user action to copy previously selected content;
when the length of the selected content does not meet the length criterion:
predicting a second type of applications, from among the plurality of types of applications, and
predicting, as the predicted application, a given application, that is of the second type of applications;
causing a user control for the predicted application to be displayed on the computing device, and
responding to user selection of the user control by activating the predicted application on the computing device.

* * * * *